May 6, 1952  R. H. MILLER  2,595,281
APPARATUS FOR USING ONE CYLINDER OF AN INTERNAL-COMBUSTION
ENGINE INTERCHANGEABLY AS A PUMP AND A POWER CYLINDER
Filed Nov. 14, 1947  2 SHEETS—SHEET 1
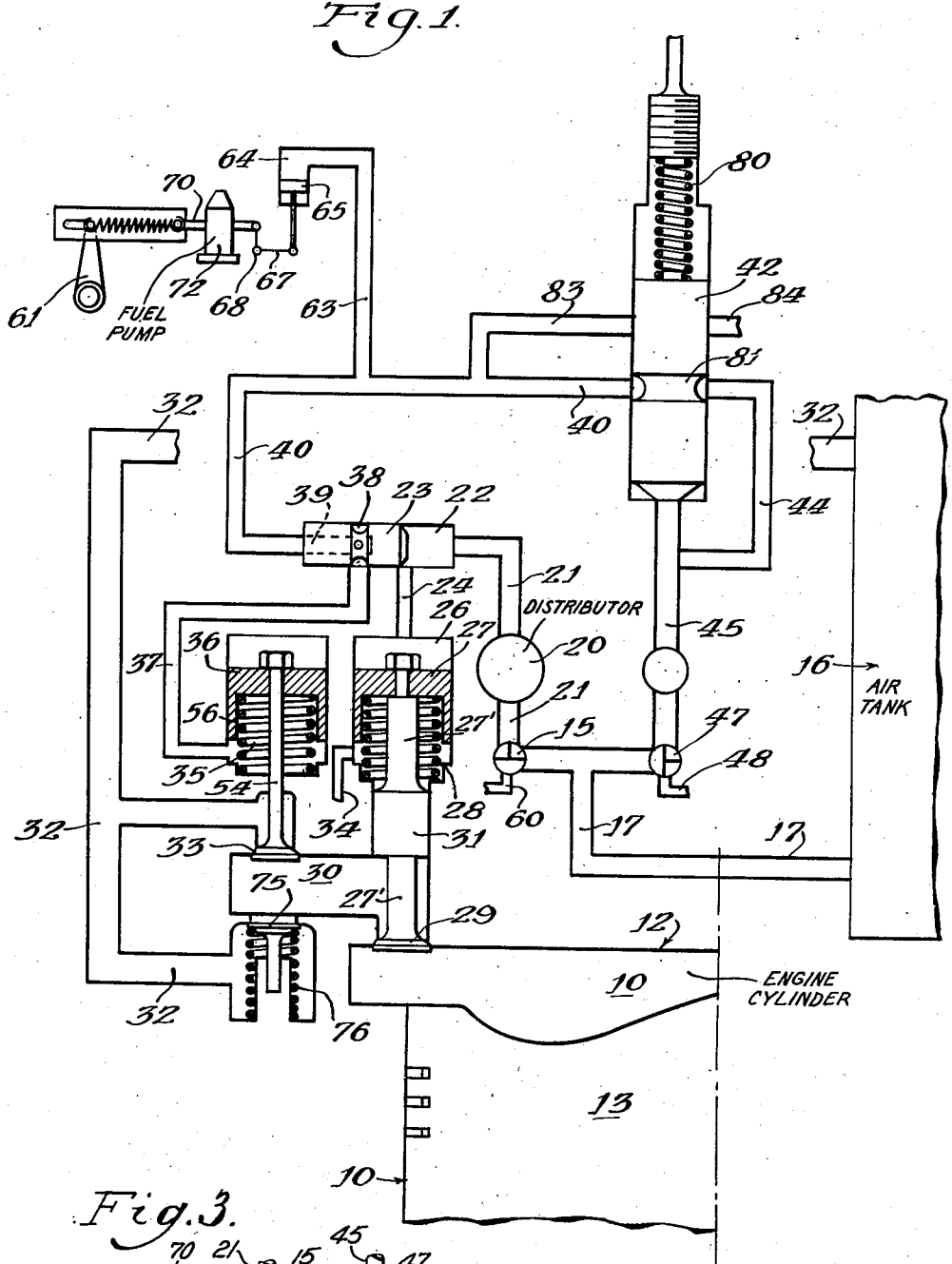
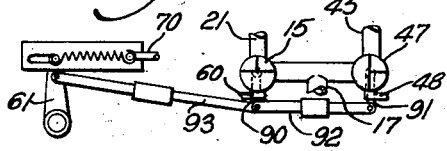
Inventor:
Ralph H. Miller
By: Eugene H. Simpson
Attorney

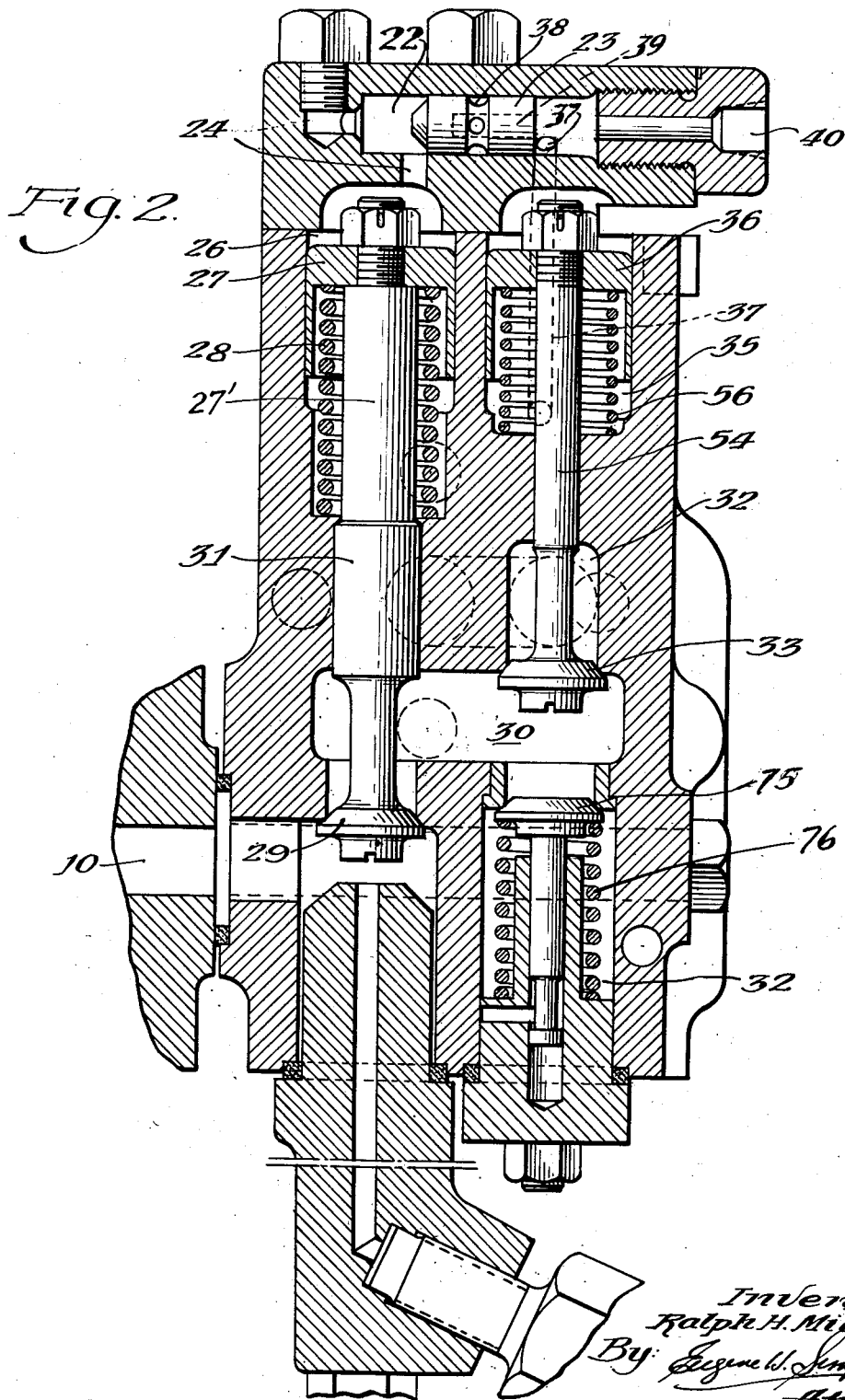

Patented May 6, 1952

2,595,281

UNITED STATES PATENT OFFICE 2,595,281

APPARATUS FOR USING ONE CYLINDER OF AN INTERNAL-COMBUSTION ENGINE INTERCHANGEABLY AS A PUMP AND A POWER CYLINDER

Ralph H. Miller, Milwaukee, Wis., assignor to Nordberg Manufacturing Co., Milwaukee, Wis., a corporation of Wisconsin Application November 14, 1947, Serial No. 785,841

5 Claims. (Cl. 60—16)

My invention relates to a control valve assembly and mechanism for starting air for internal combustion engines.

It is customary in diesel engines to start the engine by means of compressed air, usually stored in a pressure reserve tank during periods of operation of the engine and supplied to the engine through an air distributor when it is desired to start the engine.

Pressure is usually maintained in the pressure reserve tank by a separate electric pump or a pump operated directly from the engine. One of the regular engine cylinders may also be used as a pump by supplying that cylinder with a special valve which will cause the cylinder to function as a pump. The present invention contemplates a system employing such a valve for use on internal combustion engines.

It is an object of the present invention to provide an automatic recharger for pressure reserve tanks of internal combustion engines that will automatically replenish the air in the tank during periods of light load on the engine.

Another object is to provide a recharger for air pressure reserve tanks on internal combustion engines which will automatically cease charging when a predetermined maximum pressure is attained.

A further object of the invention is to provide a recharger for air pressure reserve tanks for internal combustion engines which will prevent overcharging.

A further object is to provide a device which will cause one engine cylinder of a multi-cylinder engine to function as a pump to replenish air in an air pressure reserve tank during periods of light load on the engine.

A still further object is to provide a combined starting and charging valve adapted to either start the engine, or to cause one cylinder thereof to function as an air pump for a pressure reserve tank, which will function correctly under all conditions.

A still further object of the invention is to provide a combined air charging and starting valve for internal combustion engines employing air starting, and an air pressure reserve tank, which will not be affected by excessive engine pressure.

Other objects of the invention will become apparent upon considering the following specification, which, when taken in conjunction with the accompanying drawings discloses one form of the invention.

In the drawings:

Fig. 1 is a diagrammatic view of the air charger system, including the valves and piping;

Fig. 2 is a transverse cross-section through an air charger valve suitable for use on a diesel engine; and Fig. 3 is a diagrammatic showing of the connection between the speed lever and the air valves.

Referring to Fig. 1, an engine cylinder 10, being one cylinder of a multi-cylinder engine, is shown with a head 12 formed thereon in the conventional manner. A piston 13 normally reciprocates in the cylinder 10 to produce power during the burning of the fuel in the cylinder.

To start the engine, a valve 15 is opened to permit air under pressure to flow from the tank 16, through a passage 17, through the valve 15, and to a distributor 20. The distributor 20 is of the usual type. Its details form no part of the present invention. Suffice it to say that it consists of rotating distribution valve means which rotate in consonance with the rotation of the engine crank shaft being connected thereto by any suitable means, there being one for each of the cylinders. The particular one used in connection with the cylinder, which in this case may also be used as a pump to replace the starting air, is illustrated only diagrammatically at 20.

For the cylinder 10 air is supplied from the distributor 20, through a passage 21, into a valve chamber 22, moving a free piston valve 23 to the left, as seen in Fig. 1, to permit the air periodically to flow out of the valve chamber 22 through the passage 24 into the top of a cylinder 26.

When the air enters the cylinder 26 from the distributor 20 it moves a piston 27 downwardly in the cylinder 26 against the action of a spring 28. The piston 27 has a valve stem 27' formed thereon, which, when the piston moves downwardly, opens a starting valve 29 between the cylinder 10 and a chamber 30.

A piston 31 is formed on the valve stem 27' and operates in an aperture in the passage 30 between the piston 27 and the starter valve 29, the piston 31 being of an area equal to or slightly greater than the valve 29 so that air pressure within the chamber 30 is balanced between the valve 29 and the piston 31 and has no tendency to open the valve 29, opening of the valve 29 being due solely to air pressure within the cylinder 26. A vent 34 in the lower end of the cylinder 26, between the pistons 27 and 31, permits free movement of the pistons.

Opening the valve 29 causes air to flow from the air pressure reserve tank 16 through a manifold 32 opening and passing through a valve 33, through the chamber 30 past the valve 29 and into the cylinder 10.

When the engine is being started, the free piston valve 23 is moved to the left as explained above, which piston movement permits air to drain out of a cylinder 35 beneath a piston 36, through a passage 37, through passages 38, 39 in the valve 23, through a passage 40, past a spring loaded plunger valve 42, through passages 44, 45 and through a valve 47 and out a vent 48 to atmosphere.

The piston 36, which is greater in diameter than the valve 33, is connected thereto by a rod 54, so that movement of the piston 36 causes a corresponding movement of the valve 33.

The valve 33 is urged into closed position and the piston 36 into uppermost position (as seen in Fig. 1) by a spring 56, as well as by air pressure beneath the piston 36. When there is no air pressure beneath the piston 36, the valve 33 is free to open and close in response to pressure changes within the manifold 32 and the chamber 30. Thus when there is no pressure within the cylinder 35, the valve 33 will open under the pressure of air in the manifold 32 when the valve 29 opens to admit air to the cylinder 10 to start the engine.

The valves 15 and 47 are so interconnected by any suitable means such as levers on the valve stems joined by a link or chain and pulley arrangement, the details of which form no part of the present invention and which are therefore not specifically illustrated in this diagrammatic showing, that when the valve 15 is opened to engine starting position, the valve 47 is opened to permit air to vent from the passage 45, through the vent 48 to atmosphere, and when the valve 47 is opened to permit air to flow from the pressure tank 16 through the passage 17 and into the passage 45, the valve 15 is opened to permit air to drain from the passage 21 through a vent 60 to atmosphere.

It will be noted at this point that the pistons 27 and 36 are of considerably greater diameter than the valves 29 and 33 respectively, which are actuated thereby. Manifold pressure, therefore, as received from the air pressure reserve tank 16, beneath the piston 36, will retain the valve 33 closed against pressure in the manifold 32. Similarly, pressure from the air pressure reserve tank 16 above the piston 27 is sufficient to open the valve 29 and maintain it open during the time pressure remains above the piston 27.

The valve 29 may be the same area or a slightly smaller area than the piston 31 so that there is no tendency of the valve 29 to open because of pressure within the chamber 30.

After the engine has started, the valve 15 may be turned so that air drains from the cylinder 26 through the passages 24 and 21 and out to atmosphere through a vent 60.

The speed lever 61 is connected to the valve 47 so that they move in unison, the lever 61 being set manually by the operator for the selected engine speed or load. The details of the connection between the governor are not shown; the speed setting means and the valve 47 are not illustrated as they are conventional and their details form no part of the present invention. It is thought that their inclusion would unduly complicate the diagrammatic drawing of Figure 1.

When the engine is running at light loads the connection with the speed lever 61 opens the valve 47 to permit air to flow from the air pressure reserve tank 16, through the passage 17, past the valve 47, through the passages 45, 44, past the spring loaded plunger valve 42, through the passage 40, into the valve chamber 22, moving the free piston valve 23 to the right. Moving the valve 23 to the right permits air to flow through the passages 39 and 38 in the valve 23, and thence through the passage 24 into the cylinder 26 to move the piston 27 downwardly and open the valve 29 between the chamber 30 and the cylinder 10.

At the same time as air flows into the cylinder 26, air passes from the valve chamber 22 downwardly through passage 37 and into the cylinder 35 beneath the piston 36, forcing the piston 36 upwardly and retaining the valve 33 closed against pressure in the manifold 32 as explained above.

Simultaneously, air under pressure passes from the passage 40, through a passage 63, into a cylinder 64, moving a piston 65 in the cylinder 64 downwardly. Moving the piston 65 downwardly rotates a bell crank lever 67 about its pivot 68, moving a rack 70 on a fuel pump 72 to the right as seen in Fig. 1. The fuel pump 72 normally supplies oil to the cylinder 10 and the rack 70 rotates the fuel pump piston to adjust the quantity of oil delivered to the cylinder 10. Moving the rack 70 to the right, as seen in Fig. 1, shuts off the supply of oil to the injection nozzle in the cylinder 10. Thus during any period which the cylinder 10 is being used to recharge the air pressure reserve tank, there is no fuel being supplied to the cylinder, and only pure air is pumped into the tank 16.

With the valve 29 held open and the valve 33 retained closed by reason of pressure in the passage 40, and no fuel being delivered to the cylinder 10 as explained above, air is drawn into the cylinder 10 through the usual air inlet valve for the engine, which is only the usual type of cam shaft controlled poppet valve characteristic of most internal combustion engines, the details of which form no part of the present invention and have been omitted in the interest of clearness in the diagrammatic showing of Figure 1, on the suction or down stroke of the piston 13, and expelled from the cylinder 10, as the piston moves up, through the open valve 29 into the chamber 30.

As the pressure of air in the chamber 30 exceeds manifold pressure, the air is expelled from the chamber 30 past an outwardly opening valve 75 in the wall of the chamber 30, and into the manifold 32 for delivery to the air pressure reserve tank 16. A spring 76 normally retains the valve 75 closed and prevents passage of air from the manifold 32 into the chamber 30. The pumping of air into the air pressure reserve tank 16 by the cylinder 10 continues as long as the speed lever 61 is in the slow speed operation (light load) position.

As pressure builds up in the tank 16 through the continued pumping of air by the cylinder 10, pressure increases equally in the passage 45. When the pressure has built up to a desired maximum (usually about 250#/sq. in.), the air pressure acting against the small area of the lower end of the spring loaded plunger valve 42 raises it off its seat against the resistance of a spring 80. Once the plunger valve 42 is off its seat the air pressure acts over the entire area of the lower end of the plunger to raise it quickly to its full uppermost position.

When the plunger valve 42 moves upwardly it closes the passage 81 between passages 40 and 44, and in its uppermost position the groove 81 opens a passage between a by-pass passage 83 and a vent 84 to atmosphere, enabling air to bleed from the cylinders 26 and 35, past the valve 23, through the passage 40, the by-pass 83, through the passage 81, and out the vent 84 to atmosphere.

At the same time, air pressure is relieved in the cylinder 64, through the passages 63 and 40, through the by-pass 83, past the valve 42 and out the vent 84. Venting the pressure in the cylinder 64 permits the throttle 61 to return the fuel pump 72 to its normal setting so that it again starts pumping oil to cylinder 10 to restart that cylinder firing.

Simultaneously, release of the pressure in the cylinder 26 by action of the valve 42 enables the spring 28 to close the valve 29 and stop the pumping of air by the cylinder 10 into the tank 16.

When the air pressure in the tank 16 falls below a desired average, the plunger valve 42 moves downwardly into the position shown in Fig. 1 to permit charging during periods of light load.

Fig. 2 shows a commercial valve built in accordance with the principles noted above and described in relation to the apparatus shown in Fig. 1. Similar parts in Fig. 2 are accorded the same reference numerals as Fig. 1.

The diagrammatic showing of Fig. 3 illustrating the connection between the speed lever 61 and valves 15 and 47 includes lever 90 associated with valve 15 and the lever 91 associated with valve 47, connecting link 92 joining levers 90 and 91 and connecting link 93 between levers 90 and 61.

It will be realized that the hereinbefore described form of the invention is to be taken merely as a preferred embodiment thereof and that various changes in size, shape and arrangement of parts may be made without departing from the spirit of the invention or the scope of the subjoined claims.

That which is new and is desired to be secured by United States Letters Patent is:

1. In combination with an internal combustion engine, including an engine cylinder and intake and exhaust ports, an air chamber in communication with the cylinder, a starting air valve adapted to open and close the communication between the air chamber and the cylinder, a reservoir adapted to hold starting air under pressure, a manifold joining the tank and the chamber, two valves between the manifold and the chamber, one of said valves being a check valve adapted when the pressure in the chamber exceeds the pressure in the manifold by a predetermined amount to open to permit air to travel toward the reservoir, the other being a spring loaded valve adapted to open when pressure in the manifold exceeds the pressure in the chamber by a predetermined amount to permit air to enter the chamber from the manifold, pistons associated with the spring loaded valve and the starting air valve, cylinders in which said pistons are mounted for reciprocation, pneumatic control piping leading from the reservoir to said cylinders, timing means for periodically admitting air to the cylinder associated with the starting valve to open it during starting movement of the engine, valve means independent of the timing of the engine for controlling air flow through the control piping to exert pressure on the piston associated with the spring loaded valve to hold it closed during engine operation independent of the pressure differential between the air chamber and the conduit.

2. In combination, a reservoir adapted to contain air under pressure, an air chamber, a working air conduit between the reservoir and the chamber, a spring loaded check valve between the working air conduit and the air chamber adapted to open when the pressure in the chamber exceeds the pressure in the conduit by a predetermined amount, a spring loaded discharge valve between the conduit and the chamber adapted to open when the pressure in the conduit exceeds the pressure in the chamber by a predetermined amount, the air chamber having a discharge port, a master valve adapted to open and close the discharge port, yielding means adapted to hold the master valve in closed position, pistons associated respectively with the discharge and the master valves, cylinders in which such pistons are mounted for reciprocation, a control air conduit between the reservoir and the cylinders whereby air may be admitted to said cylinders selectively to open the master valve and to hold the discharge valve closed, a control valve for such conduit adapted when in one position to free the discharge valve from pneumatic control while the master valve is open and in another position to force the master valve open and hold the discharge valve in closed position, yielding means operative in response to increase in pressure in the reservoir above a predetermined point for closing the pneumatic control passages to cause the master valve to close.

3. In combination, a reservoir adapted to contain air under pressure, an air chamber, a working air conduit between the reservoir and the chamber, a spring loaded check valve between the working air conduit and the air chamber adapted to open when the pressure in the chamber exceeds the pressure in the conduit by a predetermined amount, a spring loaded discharge valve between the conduit and the chamber adapted to open when the pressure in the conduit exceeds the pressure in the chamber by a predetermined amount, the air chamber having a discharge port, a master valve adapted to open and close the discharge port, yielding means adapted to hold the master valve in closed position, pistons associated respectively with the discharge and the master valves, cylinders in which such pistons are mounted for reciprocation, a control air conduit between the reservoir and the cylinders associated with the master valve and a control air conduit between the reservoir and the cylinder associated with the discharge valve, manually operable valve means for said conduits, bleeder ports associated with said valve means, each adapted to bleed one conduit when the other valve permits air to pass therethrough from the reservoir and vice versa, a piston valve associated with both said conduits adapted, when air is admitted to the cylinder associated with the master port, to connect the cylinder associated with the discharge valve to the bleeder, and when air is admitted to the conduit leading to the discharge valve adapted to permit the entrance of air from the control conduit to both of said cylinders whereby the master valve is held open and the discharge valve is held closed, a spring pressed plunger valve exposed to the pressure of the air in the second conduit adapted, when the pressure exceeds a predetermined point, to close such conduit and permit closure of the master valve and opening of the discharge valve.

4. In combination with the combustion chamber of a cylinder of a multi-cylinder, self-ignition engine, an air chamber, a starting valve adapted to open and close the communication between the combustion chamber and the air chamber, a receiver for compressed air, a conduit between it and the air chamber, a spring loaded check valve adapted to permit flow of air from the air chamber to the conduit when the pressure in the chamber exceeds the pressure in the conduit, an auxiliary starting valve between the conduit and the air chamber, yielding means biased to seat the starting and the auxiliary valves, means for simultaneously opening the starting valve and closing the auxiliary valve and means for preventing the supply of fuel to the combustion chamber when the auxiliary valve is closed.

5. In combination with the combustion chamber of a cylinder of a multi-cylinder, self-ignition engine, an air chamber, a starting valve adapted to open and close the communication between the combustion chamber and the air-chamber, a receiver for compressed air, a conduit between it and the air chamber, a spring loaded check valve adapted to permit flow of air from the air chamber to the conduit when the pressure in the chamber exceeds the pressure in the conduit, an auxiliary starting valve between the conduit and the air chamber, yielding means biased to seat the starting and the auxiliary valves, means for simultaneously opening the starting valve and closing the auxiliary valve and means for preventing the supply of fuel to the combustion chamber when the auxiliary valve is closed, automatic means responsive to increase in pressure in the receiver for closing the starting valve and for supplying fuel to the combustion chamber.

RALPH H. MILLER.

REFERENCES CITED

The following references are of record in the file of this patent:

UNITED STATES PATENTS

| Number | Name | Date |
|---|---|---|
| 1,013,723 | Barbey | Jan. 2, 1912 |
| 1,577,665 | Wakefield | Mar. 23, 1926 |
| 1,713,545 | Miller | May 21, 1929 |
| 2,173,857 | Phillips | Sept. 26, 1939 |
| 2,379,945 | Wyatt | July 10, 1945 |
| 2,422,733 | Jimerson | June 24, 1947 |